(12) United States Patent
Kuo et al.

(10) Patent No.: US 12,547,457 B2
(45) Date of Patent: Feb. 10, 2026

(54) GENERATE PROGRAM DIRECTIVES USING BEAM SEARCH GUIDED BY NEURAL NETWORK COST MODEL

(71) Applicant: MediaTek Inc., Hsinchu (TW)

(72) Inventors: Wei-Liang Kuo, Hsinchu (TW); Ming-Yu Hung, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 258 days.

(21) Appl. No.: 18/446,566

(22) Filed: Aug. 9, 2023

(65) Prior Publication Data
US 2024/0053968 A1 Feb. 15, 2024

Related U.S. Application Data

(60) Provisional application No. 63/371,120, filed on Aug. 11, 2022.

(51) Int. Cl.
*G06F 9/48* (2006.01)
*G06F 8/41* (2018.01)
*G06N 3/02* (2006.01)

(52) U.S. Cl.
CPC ............ *G06F 9/4881* (2013.01); *G06F 8/41* (2013.01); *G06N 3/02* (2013.01); *G06F 8/4441* (2013.01)

(58) Field of Classification Search
CPC .......... G06F 8/41; G06F 8/433; G06F 8/4441; G06F 9/4881; G06N 3/02
See application file for complete search history.

(56) References Cited

U.S. PATENT DOCUMENTS

2024/0037150 A1* 2/2024 Yang ..................... G06N 5/022

OTHER PUBLICATIONS

Gao, Chao, et al., A Memory-Bounded Best-First Beam Search and Its Application to Scheduling Halide Programs, Fifteenth International Symposium on Combinatorial Search, 2022, 9 pages, [retrieved on Jun. 20, 2025], Retrieved from the Internet: <URL:https://ojs.aaai.org/index.php/SOCS/article/download/21754/21518>.*
Andrew Adams, et al., "Learning to optimize halide with tree search and random programs," ACM Trans. Graph., vol. 38, No. 4, Article 121, Jul. 2019.
Shikhar Singh et al: "Using Graph Neural Networks to model the performance of Deep Neural Networks," arXiv:2108.12489v1 [cs.LG], Aug. 27, 2021.
Jingwei Zhuo et al: "Learning Optimal Tree Models Under Beam Search," arXiv:2006.15408v1 [stat.ML], Jun. 27, 2020.
The Extended European Search Report, Application #23190795, mailed Nov. 15, 2023.

* cited by examiner

*Primary Examiner* — Geoffrey R St Leger
(74) *Attorney, Agent, or Firm* — Tong J. Lee (57) ABSTRACT

A computing system generates directives of a program. Beam nodes are selected one level at a time from multiple nodes in the tree structure. Each node represents a subset of operations in the program. A first number of the beam nodes are selected at a given level of the tree structure. The selection of the first number of the beam nodes uses a cost model that is based on a neural network. A second number of the beam nodes are selected using a random search. The ratio of the first number to the second number is determined based on a search completion percentage at the given level. A path is identified that passes through respective beam nodes at multiple levels of the tree structure. The path represents a schedule for executing the program on a target machine. Then the directives corresponding to the schedule are generated.

20 Claims, 5 Drawing Sheets

GENERATE PROGRAM DIRECTIVES USING BEAM SEARCH GUIDED BY NEURAL NETWORK COST MODEL

CROSS-REFERENCE TO RELATED APPLICATIONS

This application claims the benefit of U.S. Provisional Application No. 63/371,120 filed on Aug. 11, 2022, the entirety of which is incorporated by reference herein.

TECHNICAL FIELD

Embodiments of the invention relate to automatic generation of directives for a computer program; more specifically, to the use of random search and a neural network to determine the directives.

BACKGROUND OF THE INVENTION

Advanced programming languages, such as Halide, allow a programmer to separate the algorithm of a program from the schedule of the program. The algorithm defines what the programmer wants to compute, such as a collection of functions. The schedule defines how the program is to be executed. Given the algorithm of the program, the search space for all possible schedules can be prohibitively large, making it infeasible to find a fastest schedule for program execution on a target machine. Prior research attempts to solve the scheduling problem by searching in an overly-restricted search space or by relying on inaccurate cost model estimations. Thus, there is a need for improving the automatic scheduling of programs for fast execution on target hardware.

SUMMARY OF THE INVENTION

In one embodiment, a method is provided for generating directives of a program. The method starts with the step of selecting, one level at a time, beam nodes from multiple nodes in a tree structure. Each node represents a subset of operations in the program. The method further comprises the step of selecting, at a given level of the tree structure, a first number of the beam nodes using a cost model that is based on a neural network and a second number of the beam nodes using a random search. The ratio of the first number to the second number is determined based on a search completion percentage at the given level. The method further comprises the steps of identifying a path that passes through respective beam nodes at a plurality of levels of the tree structure, wherein the path represents a schedule for executing the program on a target machine; and generating the directives corresponding to the schedule.

In another embodiment, a system is provided for generating directives of a program. The system comprises one or more processors, and memory to store the program. The one or more processors are operative to select, one level at a time, beam nodes from a plurality of nodes in a tree structure, wherein each node represents a subset of operations in the program; select, at a given level of the tree structure, a first number of the beam nodes using a cost model that is based on a neural network and a second number of the beam nodes using a random search. The ratio of the first number to the second number is determined based on a search completion percentage at the given level. The one or more processors are further operative to identify a path that passes through respective beam nodes at a plurality of levels of the tree structure, wherein the path represents a schedule for executing the program on a target machine; and generate the directives corresponding to the schedule.

Other aspects and features will become apparent to those ordinarily skilled in the art upon review of the following description of specific embodiments in conjunction with the accompanying figures.

BRIEF DESCRIPTION OF DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION OF THE INVENTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a directive generator that automatically generates directives for a computer program (referred to as a "program"). The directives describe how the program can be scheduled for execution, and can guide a compiler to optimize the program execution on a target machine. The target machine can be any processing device with one or more processors and memory. Although the term "compiler" is used throughout the description, it is understood that the techniques described herein also apply to an interpreter. The program is partitioned into multiple blocks, such as functions, code blocks (e.g., an instruction sequence), etc. In one embodiment, the directive generator generates one or more directives for each block. According to the directives, the compiler generates executable code that is optimized to take advantage of the hardware resources provided by the target machine, such as multiple processing units, memory bandwidth, etc. When generating directives for each block, the directive generator chooses among multiple directive candidates, each of which causes the program to be executed according to a different schedule. The schedule dictates how the operations of the program are executed; e.g., how the computing resources of a target machine such as processors and memory are to be allocated to perform the operations. The schedule that enables the fastest estimated runtime on the target machine is selected. The schedule can be mapped to the directives of each block. The directives of each block guide a compiler to compile the instructions in the block; e.g., with respect to how computing resources are to be used by the instructions.

In one embodiment, the directive generator performs a search in a directed acyclic graph (DAG) (e.g., a tree structure) to determine a schedule that enables the fastest estimated runtime on the target machine. The nodes of the tree represent operations of a program to be executed. In the following description, the term "schedule" is used to refer to the search output. It is understood that the schedule corresponds to the directives of the program for guiding the compiler in generating compiled code.

In one embodiment, a beam search is used to limit the search space. In one embodiment, a cost model is used to predict the number of processing cycles for the target machine to execute the program. The cost model is based on a trained neural network. Using the cost model can avoid the use of the target machine to actually run the program. In one embodiment, a hybrid approach is used to conduct the beam search. The hybrid approach uses a combination of random search and the cost model.

Figure 1:
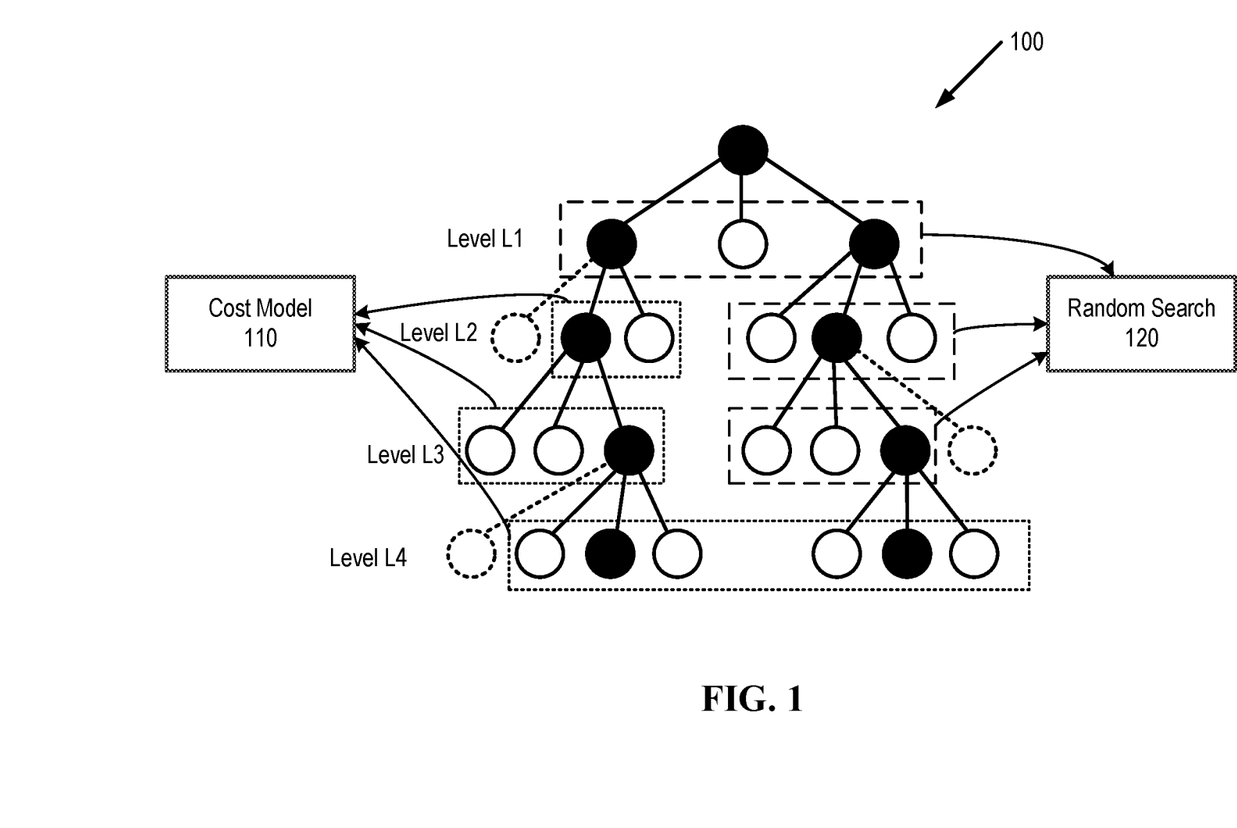
FIG. 1 is a diagram illustrating a hybrid approach to beam search according to one embodiment.

FIG. 1 is a diagram illustrating a hybrid approach to beam search according to one embodiment. A tree structure (e.g., tree 100) represents the operations of a program, where each node represents a program block (i.e., a set of operations). Different paths from the root to the leaves represent different schedules for program execution. Tree 100 is expanded and searched from the root, one level at a time. At each level of tree 100, a local evaluation is made to prune a predetermined number of nodes (represented by nodes with dashed circles). Then the rest of the nodes at that level, referred to as candidate nodes, are evaluated to select B nodes as beam nodes (represented by solid black nodes). The number of beam nodes at each level is referred to as beam width. Only the beam nodes are expanded in the next level for further search. A scheduling decision is the evaluations made at each level to select the beam nodes. In one embodiment, the search for the beam nodes is based on a combination of a cost model 110 and random search 120. In one embodiment, different levels of the tree may have different beam widths. The search output is a path formed by beam nodes from the root to a leaf node, with one beam node on the path at each tree level. Each tree level represents a stage in the search for beam nodes.

At the beginning of the search, cost model 110 has low accuracy with respect to the predicted runtime. This is because cost model 110 is trained using programs with complete schedules, but at the earlier stages of the search, cost model 110 is queried when a program is only partially scheduled. Therefore, at the earlier stages of the search, random search 120 is as good as cost model 110 in terms of accuracy and may be used to generate all or most of the beam nodes in a tree level. Random search 120 requires minimal computation cost and is therefore much faster than search by cost model 110. The cost model accuracy improves as the search progresses, as more and more of the schedule is determined. As the cost model accuracy increases, more and more nodes may be evaluated by the cost model to generate a greater portion of the beam nodes.

The example illustrated in FIG. 1 shows that tree 100 includes a root and four levels: L1, L2, L3, and L4, from top to bottom. To simplify the illustration, this example shows a beam search with a constant beam width of two. Also, tree 100 includes much fewer nodes and levels than a tree that is normally used in directive generation.

In this example, random search 120 is used to search for beam node(s) from the candidate nodes in a dashed box, and cost model 110 is used to search for beam node(s) from the candidate nodes in a dotted box. At level L1, only random search 120 is used to identify the two beam nodes. At level L4, only cost model 110 is used identify the two beam nodes. At each of the intermediate levels (e.g., levels L2 and L3), a combination of cost model 110 and random search 120 is used. The ratio of cost model usage versus random search usage may be determined by profiling cost model 110 on a target machine prior to the search. More specifically, this ratio can be determined according to the accuracy of cost model 110 at different stages of a search. The higher the cost model accuracy, the higher it is for the cost model usage.

A complete schedule of the program is represented by a path from the root to a beam node at the bottom level of the tree. This schedule is formed by a sequence of scheduling decisions, with each scheduling decision made at each tree level with respect to a selected beam node on the path. Each scheduling decision corresponds to a set of directives for the selected beam node. The directives for all of the beam nodes on the path are sent to a compiler to guide the compiler in code generation.

Figure 2:
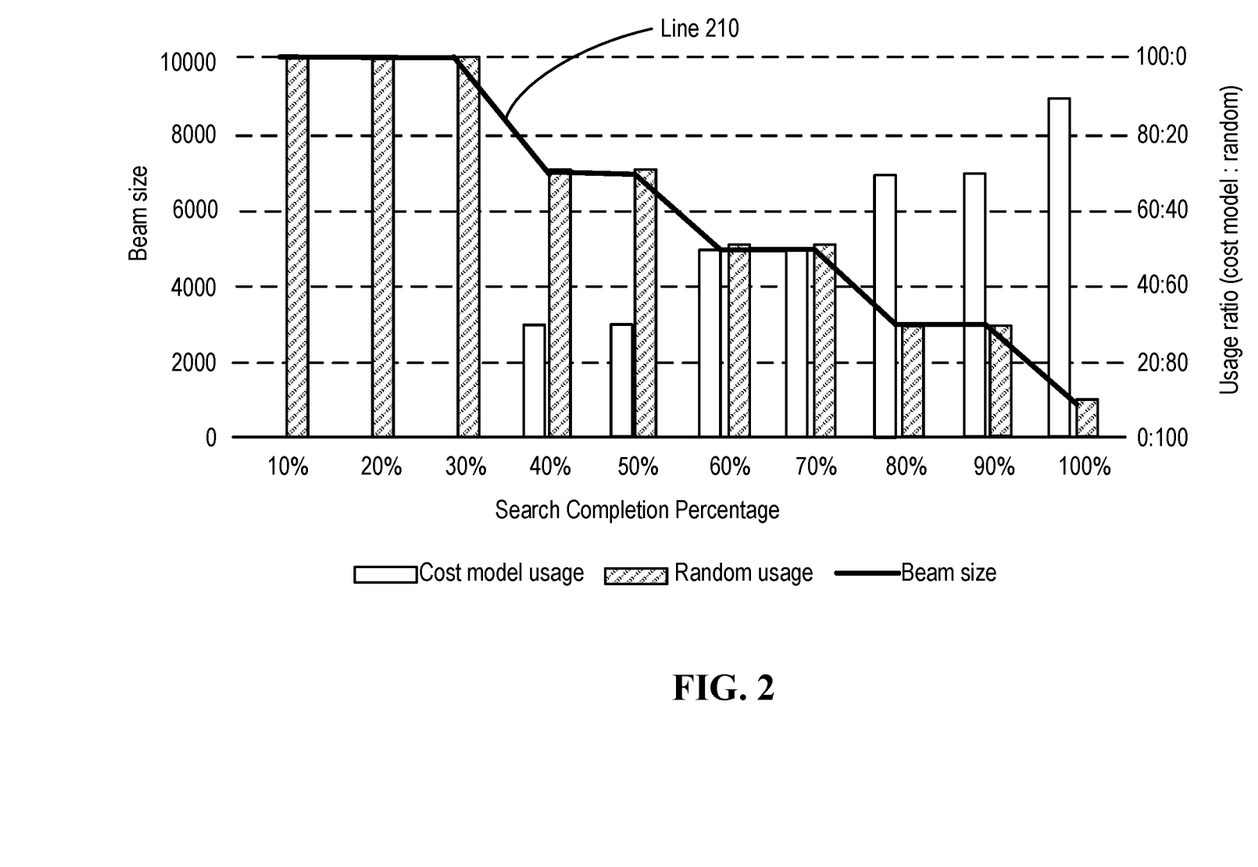
FIG. 2 is a diagram illustrating an example of adjusting cost model usage and beam size according to one embodiment.

FIG. 2 is a diagram illustrating an example of adjusting cost model usage and beam size according to one embodiment. It is understood that the numbers shown in the example are illustrative and non-limiting. The cost model usage is illustrated with solid white bars, and the random search usage is illustrated with slanted-line bars. The right-hand side of the diagram shows that the ratio of cost model usage versus the random search usage increases as the search progresses toward completion. Furthermore, the thick black line (i.e., line 310) represents the beam size, which decreases as the search progresses toward completion. The search completion percentage can be measured by the percentage of the program that has been evaluated and scheduled. The search completion percentage may correspond to the ratio of the evaluated number of tree levels to the total number of tree levels. In this example, the beginning 30% of the search uses only the random search. This 30% of the search may correspond to multiple levels of the search tree.

It is noted that the higher usage of random search corresponds to a large beam size. The larger beam size is used at the beginning of the search when the search space is relatively manageable by the computer that runs the search. The larger beam size at the beginning of the search aims at including as many candidate nodes as possible to minimize the probability that good candidate nodes are not selected by random search. As the search progresses, beam size decreases, which corresponds to higher accuracy and higher usage of the cost model. The decrease in beam size is in later stage of the search avoids explosion in required computing resources for the search.

In one embodiment, the candidate nodes at each tree level is divided into two non-overlapping groups. The first group is evaluated by cost model 110 to select a set of $C_i$ beam nodes and the second group is randomly sampled to select a set of $R_i$ beam nodes, where $C_i+R_i=B_i$, and $B_i$ is the number of beam nodes at the i-th tree level. Moreover, the ratio of the first group size versus the second group size is equal to $C_i/R_i$, or substantially equal to $C_i/R_i$ (within a predetermined tolerance), where the group size is the number of candidate nodes in the group. The ratio of Ci to Ri increases as the search progresses. More specifically, the ratio of Ci to Ri increases as the search completion percentage increases from 0 to 100.

In one embodiment, the values of Ci and Ri may be determined by performing a profile analysis on a target machine. The profile analysis evaluates the cost model accuracy when the cost model is used to estimate the runtime of a partially-scheduled program on a target machine. The estimated runtime generated by the cost model is compared with the actual runtime for a fully-scheduled program to run on the target machine. Moreover, the profile analysis evaluates the cost model accuracy for the partially-scheduled program on the target machine with different percentages of scheduling completion.

Figure 3:
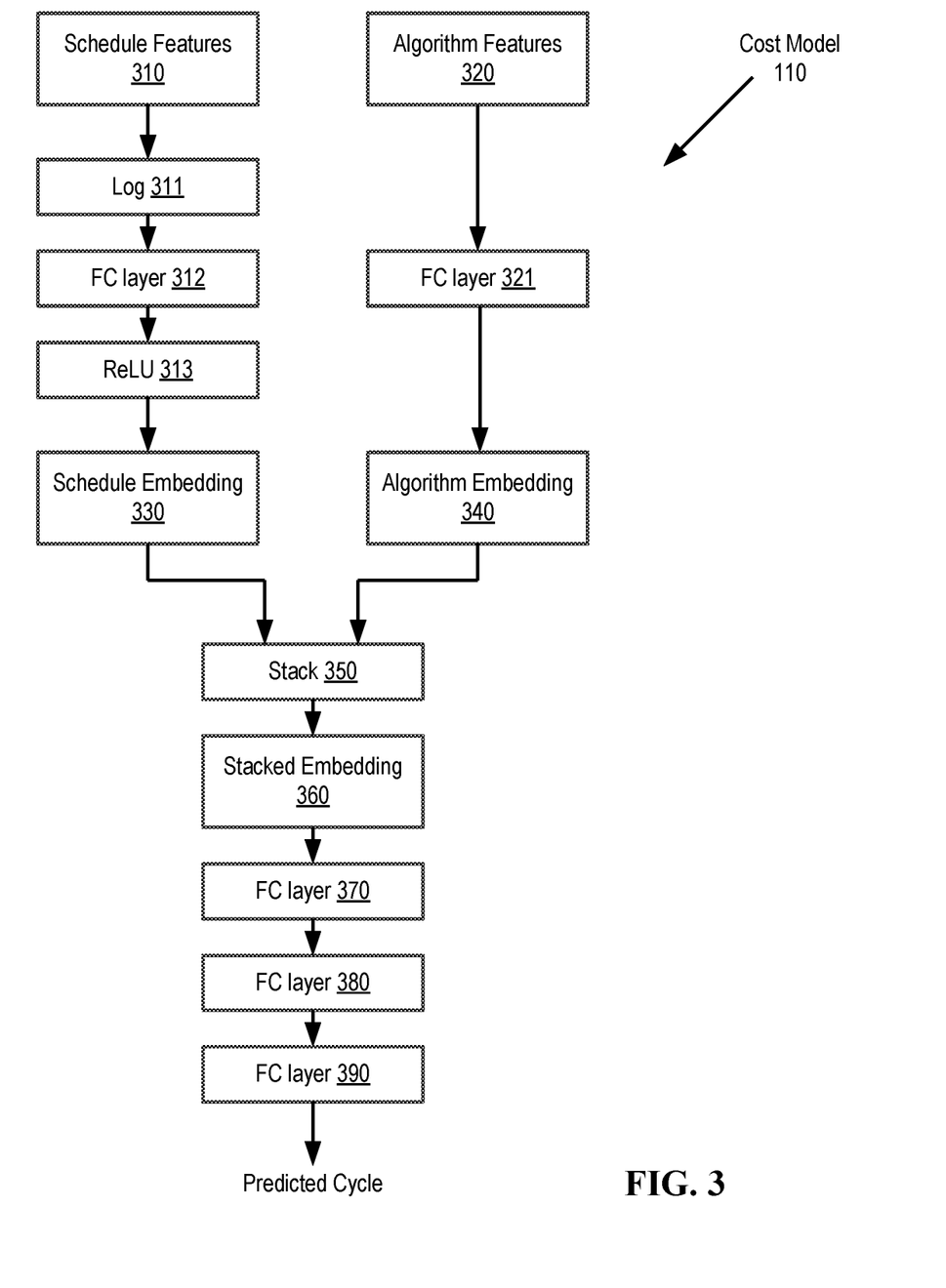
FIG. 3 is a block diagram illustrating a cost model according to one embodiment.

FIG. 3 is a block diagram illustrating a cost model according to one embodiment. The cost model may be an example of cost model 110 in FIG. 1. Cost model 110 uses a neural network to predict the runtime of a program on a target machine. The runtime may be indicated by the number of processing cycles for the target machine to execute the program according to a given schedule. As mentioned before, the schedule may be provided to a compiler as directives. For example, the compiler may receive a set of directives for each code block of a program. The neural network is trained using a collection of programs (referred to as training programs) and their corresponding directives at the input end, and the processing cycles on the target machine at the output end. The weights and parameters of the neural network are determined during the training process.

During a search process such as the example in FIG. 1, the inputs to cost model 110 include schedule features 310 and algorithm features 320. Algorithm features 320 include the operations and functions of the program to be scheduled. Schedule features 310 captures resource usage behaviors such as the usage of processors and memory. Schedule features 310 are fed into a log layer 311, a fully connected (FC) layer 312, and a ReLU layer 313 to generate a low-dimension vector referred to as schedule embedding 330. Algorithm features 320 are fed into FC layer 321 to generate a low-dimension vector referred to as algorithm embedding 340. A stack layer 350 stacks schedule embedding 330 and algorithm embedding 340 to produce a stacked embedding 360, which is fed into three FC layers 370, 380, and 390 to output a scaler value, which is the number of predicted cycles. In one embodiment, FC layer 370 increases the size of stacked embedding 360, and FC layers 380 and 390 reduce the size to one. In an example where the size of stacked embedding 360 is 32, FC layer 370 may increase the size from 32 to 128, FC layer 380 reduces the size from 128 to 64, and FC layer 390 further reduces the size from 64 to 1, which is the number of predicted cycles.

Figure 4:
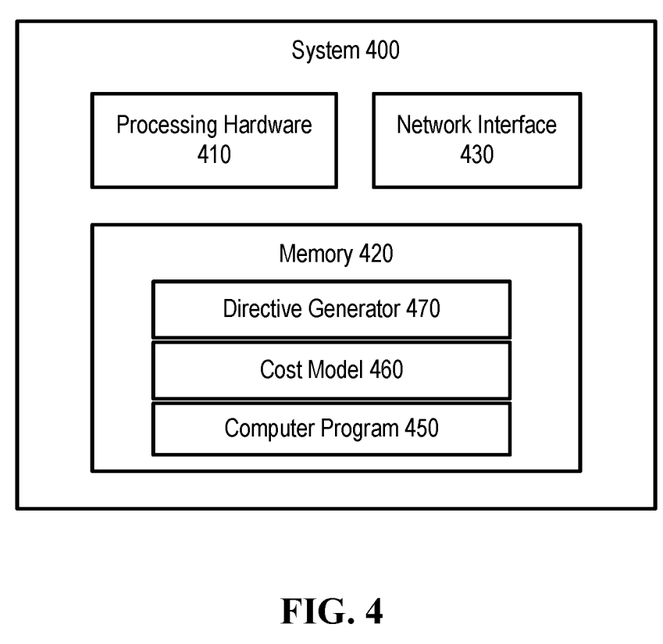
FIG. 4 is a block diagram of a system operative to generate directives for a program according to one embodiment.

FIG. 4 is a block diagram of a system 400 operative to generate directives for a program according to one embodiment. System 400 includes processing hardware 410, a memory 420, and a network interface 430. It is understood that system 400 is simplified for illustration; additional hardware and software components are not shown. Non-limiting examples of processing hardware 410 may include one or more processors including but not limited to a central processing unit (CPU), a graphics processing unit (GPU), an image processing unit, a deep learning accelerator (DLA), and the like. One or more of the processors, processing units, and/or devices in processing hardware 410 may perform the search process mentioned above.

Memory 420 may store a computer program 450, a cost model 460 (which may be an example of cost model 110 in FIG. 1 and FIG. 3), and a directive generator 470. Computer program 450 may be written in a programming language; non-limiting examples include Halide, C, C++, etc. Directive generator 470 may be executed by processing hardware 410, such as one or more processors. Directive generator 470 uses a combination of cost model 460 and random search to determine a schedule for computer program 450 and generates corresponding directives. In one embodiment, memory 420 may further include a compiler and/or an interpreter to receive the directives generated by directive generator 470. Memory 420 may include a dynamic random access memory (DRAM) device, a flash memory device, and/or other volatile or non-volatile memory devices. In one embodiment, directive generator 470 generates directives using a method 500 to be described with reference to FIG. 5.

Figure 5:
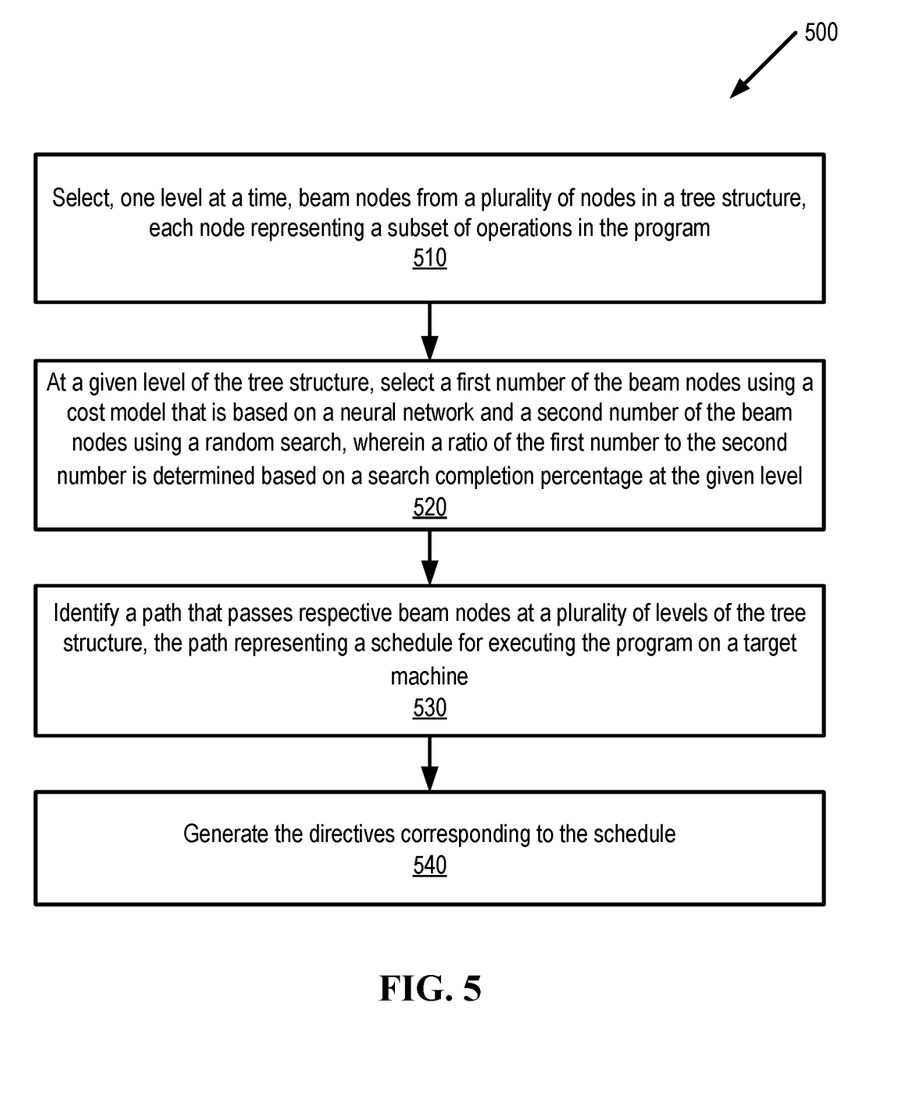
FIG. 5 is a flow diagram illustrating a method for generating directives according to one embodiment.

FIG. 5 is a flow diagram illustrating method 500 for generating directives for a program according to one embodiment. In one embodiment, method 500 may be performed by a system such as system 400 in FIG. 4.

Method 500 starts with step 510 when a system selects, one level at a time, a set of beam nodes from the nodes in a tree structure. Each node represents a subset of operations in the program. At step 520, the system selects, at a given level of the tree structure, a first number of the beam nodes using a cost model that is based on a neural network and a second number of the beam nodes using a random search. The ratio of the first number to the second number is determined based on a search completion percentage at the given level. At step 530, the system identifies a path that passes through respective beam nodes at the levels of the tree structure. The path represents a schedule for executing the program on a target machine. At step 540, the system generates the directives corresponding to the schedule.

In one embodiment, the random search may be used to select all beam nodes at one or more levels immediately below a root of the tree structure. The cost model may be used to select an increasingly larger ratio of the beam nodes as the search completion percentage increases. In one embodiment, the number of beam nodes decreases as the search completion percentage increases. After generating the directives, the directives may be sent to a compiler to generate compiled code to be executed on the target machine.

In one embodiment, a profile analysis is performed on the cost model to obtain accuracy of the cost model at different percentages of search completion. The ratio of the first number of beam nodes to the second number of beam nodes is adjusted based on the accuracy of the cost model at a given search completion percentage. The accuracy is measured with respect to a predicted number of processing cycles on a target machine.

The cost model is based on a neural network. In one embodiment, the neural network includes three consecutive fully-connected layers that outputs a scalar value representing a predicted number of processing cycles.

In one embodiment, the random search is used to randomly select the first number of beam nodes from a first group of nodes at the given level. The cost model is used to select the second number of beam nodes from a second group of nodes at the given level. The second number of beam nodes are predicted by the cost model to have the fastest runtime. The first group of nodes are non-overlapping with the second group of nodes. The first group of nodes has a first group size and the second group of nodes has a second group size. The ratio of the first group size to the second group size is equal or substantially equal to the ratio of the first number of beam nodes to the second number of beam nodes.

The operations of the flow diagram of FIG. 5 have been described with reference to the exemplary embodiments of FIG. 3 and FIG. 4. However, it should be understood that the operations of the flow diagram of FIG. 5 can be performed by embodiments of the invention other than the embodiments of FIG. 3 and FIG. 4, and the embodiments of FIG. 3 and FIG. 4 can perform operations different than those discussed with reference to the flow diagram. While the flow diagram of FIG. 5 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for generating a schedule for executing a program, comprising:
   selecting, one level at a time, beam nodes from a tree structure that includes a plurality of levels, wherein each level includes a plurality of nodes and each node represents a subset of operations in the program, and, wherein, for each level in a plurality of intermediate levels of the tree structure, selecting the beam nodes further comprises:
      selecting a first number of beam nodes from a first group of nodes using a neural network as a cost model, wherein the neural network receives an embedding of features of the program and an embedding of resource usage of a target machine, and outputs a predicted runtime of the program on the target machine; and
      randomly selecting a second number of beam nodes from a second group of nodes non-overlapping with the first group of nodes, wherein a group size ratio of the first group to the second group increases when the selecting of the beam nodes moves toward a bottom level of the tree structure;
   identifying a path that passes through a selected beam node at each level of the tree structure, wherein the path represents the schedule that optimizes runtime of the program on the target machine; and
   generating compiled code based on the schedule.

2. The method of claim 1, wherein the randomly selecting is used to select all beam nodes at one or more levels immediately below a root of the tree structure.

3. The method of claim 1, wherein the cost model is used to select an increasingly larger ratio of the beam nodes as the search completion percentage increases, wherein the search completion percentage corresponds to a ratio of an evaluated number of tree levels to a total number of tree levels in the tree structure.

4. The method of claim 1, further comprising:
   performing a profile analysis on the cost model to obtain accuracy of the cost model at different percentages of search completion; and
   adjusting a ratio of the first number to the second number based on the accuracy of the cost model at a given search completion percentage.

5. The method of claim 4, wherein the accuracy is measured with respect to a predicted number of processing cycles on the target machine.

6. The method of claim 1, wherein the number of beam nodes decreases as the search completion percentage increases.

7. The method of claim 1, wherein the neural network includes three consecutive fully-connected layers that outputs a scalar value representing a predicted number of processing cycles.

8. The method of claim 1,
   wherein the first number of the beam nodes are predicted by the cost model to have fastest runtime on the target machine among the first group of nodes.

9. The method of claim 1, wherein the group size ratio of the first group to the second group is equal or substantially equal to the ratio of the first number to the second number.

10. The method of claim 1, further comprising:
    generating directives corresponding to the schedule; and
    sending the directives to a compiler to generate the compiled code to be executed on the target machine.

11. A system for generating a schedule for executing a program, comprising:
    one or more processors; and
    memory to store the program, wherein the one or more processors are operative to:
       select, one level at a time, beam nodes from a tree structure that includes a plurality of levels, wherein each level includes a plurality of nodes and each node represents a subset of operations in the program, and wherein, for each level in a plurality of intermediate levels of the tree structure, the one or more processors are further operative to;
          select a first number of beam nodes from a first group of nodes using a neural network as a cost model, wherein the neural network receives an embedding of features of the program and an embedding of resource usage of a target machine, and outputs a predicted runtime of the program on the target machine; and
          randomly select a second number of beam nodes from a second group of nodes non-overlapping with the first group of nodes, wherein a group size ratio of the first group to the second group increases when the selecting of the beam nodes moves toward a bottom level of the tree structure;
       identify a path that passes through a selected beam node at each level of the tree structure, wherein the path represents the schedule that optimizes runtime of the program on the target machine; and
    generate compiled code based on the schedule.

12. The system of claim 11, wherein the randomly selecting is used to select all beam nodes at one or more levels immediately below a root of the tree structure.

13. The system of claim 11, wherein the cost model is used to select an increasingly larger ratio of the beam nodes as a search completion percentage increases, wherein the search completion percentage corresponds to a ratio of an evaluated number of tree levels to a total number of tree levels in the tree structure.

14. The system of claim 11, wherein the one or more processors are further operative to:
    perform a profile analysis on the cost model to obtain accuracy of the cost model at different percentages of search completion; and
    adjust a ratio of the first number to the second number based on the accuracy of the cost model at a given search completion percentage.

15. The system of claim 14, wherein the accuracy is measured with respect to a predicted number of processing cycles on the target machine.

16. The system of claim 11, wherein the number of beam nodes decreases as the search completion percentage increases.

17. The system of claim 11, wherein the neural network includes three consecutive fully-connected layers that outputs a scalar value representing a predicted number of processing cycles.

18. The system of claim 11, wherein wherein the first number of the beam nodes are predicted by the cost model to have fastest runtime on the target machine among the first group of nodes.

19. The system of claim 11, wherein the group size ratio of the first group to the second group is equal or substantially equal to the ratio of the first number to the second number.

20. The system of claim 11, wherein the one or more processors are further operative to:
    generate directives corresponding to the schedule; and
    send the directives to a compiler to generate the compiled code to be executed on the target machine.

* * * * *